US011739802B2

(12) United States Patent
Guérin et al.

(10) Patent No.: US 11,739,802 B2
(45) Date of Patent: Aug. 29, 2023

(54) CLUTCH TEMPERATURE MANAGEMENT IN A SLIP CONTROL METHOD AND ARRANGEMENT FOR A DRIVETRAIN INCLUDING A CONTINUOUSLY VARIABLE TRANSMISSION

(71) Applicant: TRANSMISSION CVTCORP INC., Sainte-Julie (CA)

(72) Inventors: Jonathan Guérin, Sainte-Julie (CA); Jean-François Dionne, Laprairie (CA); Daniel Girard, St-Mathieu-de-Beloeil (CA); François Messier, Varennes (CA)

(73) Assignee: TRANSMISSION CVTCORP INC.

( * ) Notice: Subject to any disclaimer, the term of this patent is extended or adjusted under 35 U.S.C. 154(b) by 13 days.

(21) Appl. No.: 17/612,656

(22) PCT Filed: May 28, 2020

(86) PCT No.: PCT/CA2020/050729
§ 371 (c)(1),
(2) Date: Nov. 19, 2021

(87) PCT Pub. No.: WO2020/243819
PCT Pub. Date: Dec. 10, 2020

(65) Prior Publication Data
US 2022/0221013 A1    Jul. 14, 2022

Related U.S. Application Data

(60) Provisional application No. 62/856,436, filed on Jun. 3, 2019.

(51) Int. Cl.
F16D 48/06    (2006.01)

(52) U.S. Cl.
CPC ...... *F16D 48/06* (2013.01); *F16D 2500/1088* (2013.01); *F16D 2500/10412* (2013.01);
(Continued)

(58) Field of Classification Search
CPC .......... F16D 48/06; F16D 2500/10412; F16D 2500/1088; F16D 2500/30404;
(Continued)

(56) References Cited

U.S. PATENT DOCUMENTS 5,094,129 A * 3/1992 Sugaya ............. F16H 61/66259
474/11
5,890,991 A * 4/1999 Sakakiyama ..... F16H 61/66259
701/52
(Continued)

FOREIGN PATENT DOCUMENTS

WO    2015106350 A1    7/2015

OTHER PUBLICATIONS

International Search Report for Application No. PCT/CA2020/050729 dated Aug. 21, 2020, pp. 1-3.

*Primary Examiner* — Edwin A Young
(74) *Attorney, Agent, or Firm* — Lerner David LLP

(57) ABSTRACT

Clutch temperature management in a slip control method and arrangement for a drivetrain including a continuously variable transmission is described herein. The drivetrain includes a clutch that is so controlled as to slip when a torque higher than the usable torque attempts to pass through. The temperature data from the clutch is used to determine the usable torque. Accordingly, the clutch prevents the prime mover from stalling.

13 Claims, 3 Drawing Sheets

(52) U.S. Cl.
CPC .............. *F16D 2500/30404* (2013.01); *F16D 2500/30406* (2013.01); *F16D 2500/30412* (2013.01); *F16D 2500/30421* (2013.01); *F16D 2500/30426* (2013.01); *F16D 2500/70426* (2013.01); *F16D 2500/70454* (2013.01); *F16D 2500/70458* (2013.01)

(58) Field of Classification Search
CPC . F16D 2500/30406; F16D 2500/30412; F16D 2500/30421; F16D 2500/30426; F16D 2500/70426; F16D 2500/70454; F16D 2500/70458; B60W 10/02; B60W 10/101; B60W 30/188; B60W 2510/02; B60W 2510/0638; B60W 2510/0657; B60W 2710/025; B60W 2710/1005; F16H 59/14; F16H 59/36; F16H 61/66; F16H 2059/366; F16H 2061/6604
See application file for complete search history.

(56) References Cited

U.S. PATENT DOCUMENTS

| | | | |
|---|---|---|---|
| 8,340,879 B2 | 12/2012 | Glatthaar et al. | |
| 2016/0332629 A1* | 11/2016 | Dionne | B60W 10/101 |
| 2017/0198812 A1* | 7/2017 | Girard | B60K 23/00 |

* cited by examiner

CLUTCH TEMPERATURE MANAGEMENT IN A SLIP CONTROL METHOD AND ARRANGEMENT FOR A DRIVETRAIN INCLUDING A CONTINUOUSLY VARIABLE TRANSMISSION

CROSS-REFERENCE TO RELATED APPLICATIONS

The present application is a national phase entry under 35 U.S.C. § 371 of International Application No. PCT/CA2020/050729 filed May 28, 2020, published in English, which claims priority from U.S. Provisional Patent Application No. 62/856,436, filed Jun. 3, 2019, all of which are incorporated herein by reference.

FIELD

The present disclosure generally relates to drivetrains including a continuously variable transmission (CVT). More specifically, the present disclosure is concerned with the management of a clutch temperature in a slip control method and arrangement for such a drivetrain.

BACKGROUND

CVTs are very interesting in many kinds of vehicles for their ability to continuously vary the speed ratio between the output of a prime mover and the wheels or other rotating parts of a vehicle.

However, some vehicular applications conventionally require a so-called torque converter between the prime mover and the wheels to a) prevent the prime mover from stalling when the wheels are prevented from rotating while powered and b) increase the torque when the torque converter is slipping. These applications are generally not ideal candidates for continually variable transmissions since the advantages of the CVT are mitigated from the use of a torque converter.

There is therefore a need to provide a method and arrangement preventing the prime mover from stalling and multiplying the torque when the wheels are partially or totally prevented from rotating while managing the temperature of a clutch present in the arrangement.

DETAILED DESCRIPTION

Figure 1:
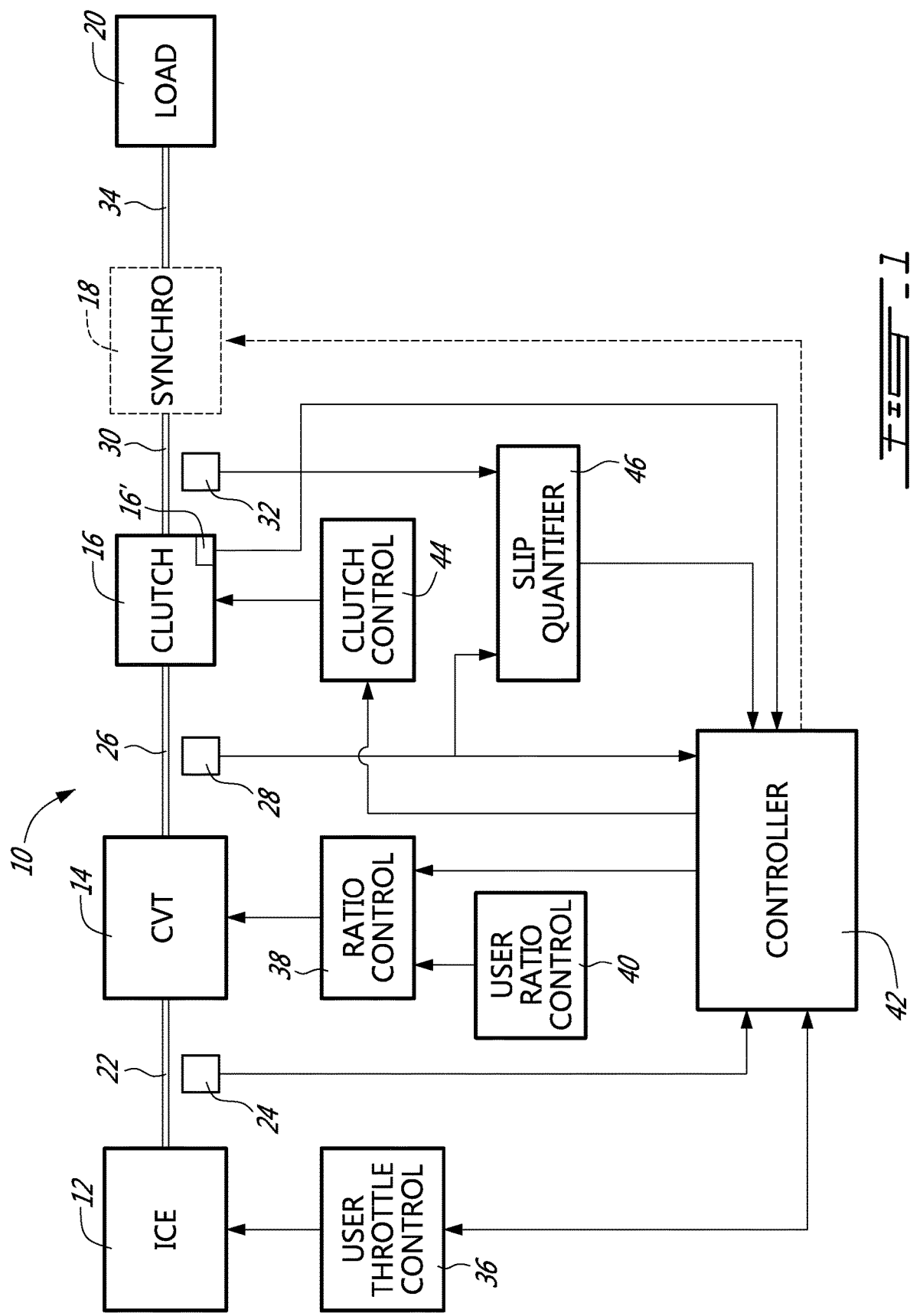
FIG. 1 is a block diagram of a drivetrain including a CVT and a slip control arrangement according to an illustrative embodiment.

An object is generally to provide an improved drivetrain including a CVT. More specifically, an object is to provide a clutch temperature management in a slip control method and arrangement used in a drivetrain including a CVT to reduce the risks of the prime mover stalling.

According to an illustrative embodiment, there is provided a method to control the slippage of a drivetrain including a prime mover having an output shaft, a transmission having an input connected to the output shaft of the prime mover and an output, a clutch having an input connected to the output of the transmission and an output; the clutch having a controllable slippage level between its input and output, means to obtain clutch temperature data; the slippage control method including: determining the usable torque of the prime mover using the clutch temperature data; and controlling the clutch so as to allow the usable torque to pass therethrough and to cause the clutch to slip should a torque between the input and output of the clutch be greater than the usable torque.

According to another aspect, there is provided a drivetrain including: a prime mover having an output shaft; a transmission having an input associated with the output shaft of the prime mover and an output; a clutch having an input associated with the output of the CVT and an output; means to determine the temperature of the clutch; a clutch slip controller controlling the level of torque allowed to pass through the clutch before slippage occurs therein; and a main controller associated with the prime mover speed sensor, the clutch temperature determining means and the clutch slip controller; the main controller being so configured as to determine a usable torque of the prime mover using clutch temperature data and to set the clutch slip controller so that the clutch slips when a torque higher than the usable torque attempts to pass through the clutch.

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The expressions "connected" and "coupled" should be construed herein and in the appended claims broadly so as to include any cooperative or passive association between mechanical parts or components. For example, such parts may be assembled together by direct connection, or indirectly connected using further parts therebetween. The connection can also be remote, using for example a magnetic field or else.

The term "about" is used to indicate that a value includes an inherent variation of error for the device or the method being employed to determine the value.

It is to be noted that the expression "prime mover" is to be construed herein and in the appended claims as an internal combustion engine (ICE), a turbine engine, or any other mechanical power production element or assembly.

It is to be noted that the term "CVT", standing for Continuously Variable Transmission, is used herein to describe any type of CVT including, amongst others, a toroidal CVT, a dual-cavity full toroidal CVT, a half-toroidal CVT, a single cavity toroidal CVT, a hydrostatic CVT, a Variable diameter pulley CVT, a magnetic CVT, a ratcheting CVT and a cone CVT.

It is to be noted that the expression "overdrive" when used in the context of a CVT, is to be construed herein and in the appended claims as a condition where the CVT ratio is such that the CVT output speed is higher than the CVT input speed. The CVT ratio (of output speed to input speed) is therefore higher that one to one (1:1).

It is to be noted that the expression "underdrive" when used in the context of a CVT, is to be construed herein and in the appended claims as a condition where the CVT ratio is such that the CVT output speed is lower than the CVT input speed. The CVT ratio (of output speed to input speed) is therefore lower that one to one (1:1).

It will also be noted that the expressions "fixed disk", when used herein and in the appended claims in the context of clutch technology, may be viewed as any element or group of elements constituting a clutch driving member. Similarly, the expressions "movable disk", when used herein and in the appended claims in the context of clutch technology, may be viewed as any element or group of elements constituting a clutch driven member.

It is to be noted that the expression "off-highway vehicle" is to be construed herein and in the appended claims as any type of vehicle that is designed specifically for use off-road, including, amongst others, construction vehicles and agricultural vehicles.

Other objects, advantages and features of the clutch temperature management in a slip control method and arrangement for a drivetrain including a continuously variable transmission will become more apparent upon reading of the following non-restrictive description of illustrative embodiments thereof, given by way of example only with reference to the accompanying drawings.

FIG. 1 of the appended drawings illustrate a drivetrain 10 comprising a prime mover in the form of an ICE 12, a CVT 14, a clutch 16, including a temperature sensor 16', and an optional synchro 18. The output of the optional synchro 18 is connected to a load 20, for example wheels of an off-highway vehicle. Of course, should the optional synchro 18 be absent from the design, the output of the clutch 16 would be directly connected to the load 20.

A first shaft 22 interconnects the output of the ICE 12 and the input of the CVT 14; the speed of the first shaft 22 is measured via a first speed sensor 24. A second shaft 26 interconnects the output of the CVT 14 and the input of the clutch 16; the speed of the second shaft 26 is measured via a second speed sensor 28. A third shaft 30 interconnects the output of the clutch 16 and the input of the optional synchro 18; the speed of the third shaft 30 is measured via a third speed sensor 32. Finally, a fourth shaft 34 interconnects the output of the optional synchro 18 and the load 20.

Of course, as mentioned hereinabove, one skilled in the art will understand that should the synchro 18 be absent, the shaft 34 would not be present and the shaft 30 would interconnect the output of the clutch 16 and the load 20.

Conventionally, the ICE 12 is associated with a user throttle control 36, for example an acceleration pedal (not shown).

The drivetrain 10 includes a ratio controller 38 so configured as to set the ratio of the CVT 14 according to either a ratio provided by the user via a user ratio control 40 or according to a ratio provided by a main controller 42 as will be described hereinbelow. It will be understood from the foregoing description that the ratio supplied by the main controller 42 has precedence over the user ratio control 40. Accordingly, the main controller 42 may take over and dictate the ratio of the CVT 14.

Alternatively, the user ratio control 40 could be omitted from the drivetrain 10 and the controller 42 would then control the ratio of the CVT according to the various data supplied thereto such as the speed of the output shaft of the ICE 12.

A clutch controller 44 is so configured as to take a usable torque value from the main controller 42 and to control the clutch 16 so as to slip when the torque attempting to pass through is greater than this usable torque. In other words, when the torque between the input and output of the clutch 16 is greater than the usable torque, the clutch 16 is so controlled as to slip.

It is believed that one skilled in the art will have no problem building such a clutch controller adapted to the technology used in the clutch 16.

The speed data from the first and second speed sensors 24 and 28 is supplied to the main controller 42 so that the controller 42 may determine the actual ratio of the CVT in real time. Furthermore, the speed data of the second and third speed sensors 28 and 32 is supplied to a slip quantifier 46 that may determine if slippage of the clutch 16 occurs and the slippage level, in real time, and supply this data to the main controller 42.

The temperature sensor 16' supplies clutch temperature data to the main controller 42.

As shown in the appended drawings, the synchro 18 and its connection to the main controller 42 are optional and shown schematically. This synchro 18 is there to represent a conventional multi speed arrangement that allows different gear ratios to be interposed between the clutch 16 and the load. Since the configurations and the operation of such a synchro are believed known to those skilled in the art, they will not be further described herein.

Figure 2:
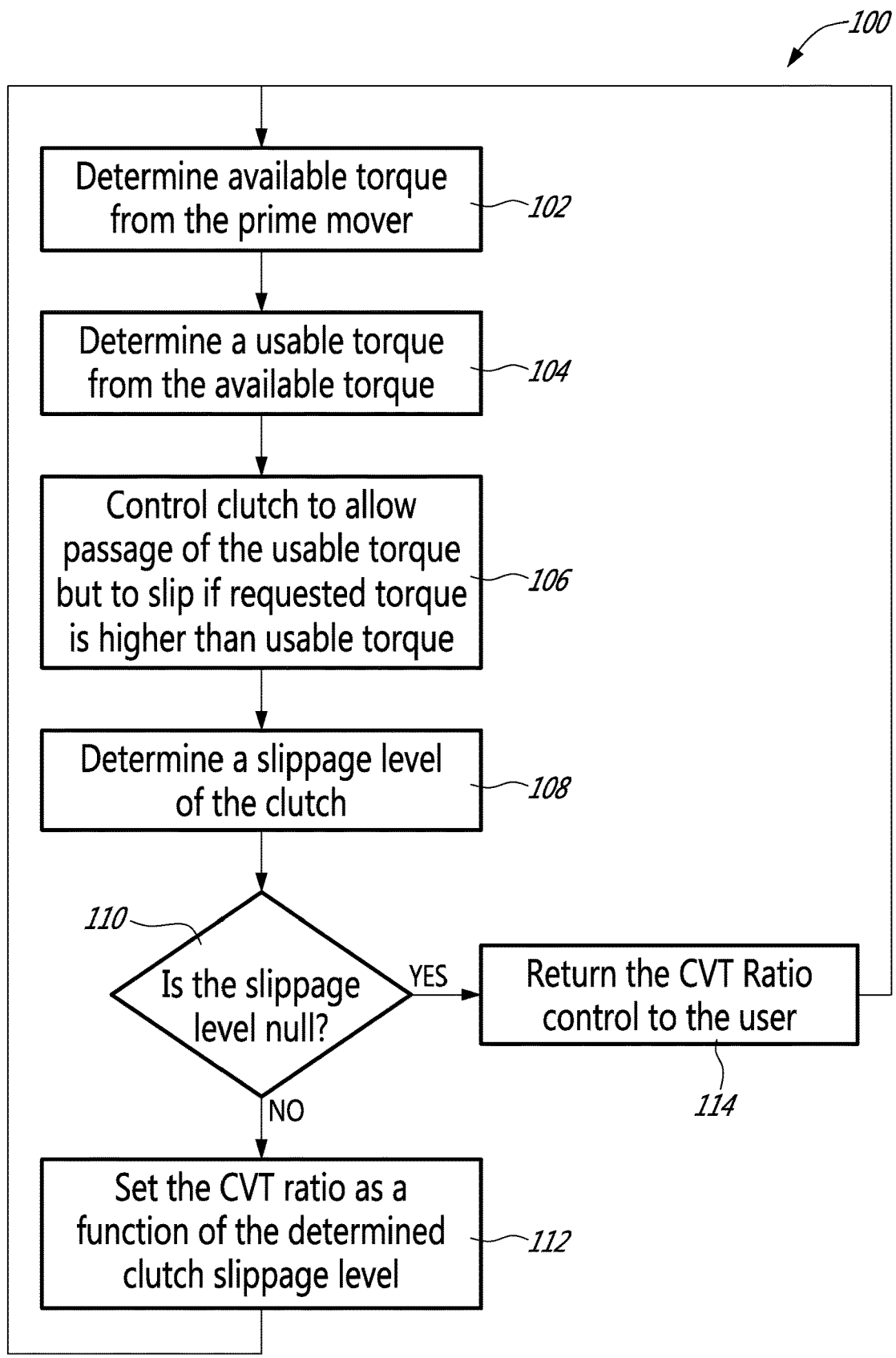
FIG. 2 is a block diagram of a method to control the slip of a clutch.

Turning now to FIG. 2 of the appended drawings, a slip control method 100 for a drivetrain including a continuously variable transmission will be described.

The first step 102 of the method 100 consists of determining the available torque from the prime mover. With reference to FIG. 1, the prime mover, in the form of the ICE 12, has a map of available torque depending on the RPM of its output shaft. This table is either built in the ICE and can be supplied to the controller 42, known and stored in the controller 42 or has been built by the drivetrain manufacturer and stored in the controller 42. Since the controller 42 has the speed data from the first speed sensor 24, it can look up the available torque in real time.

Figure 3:
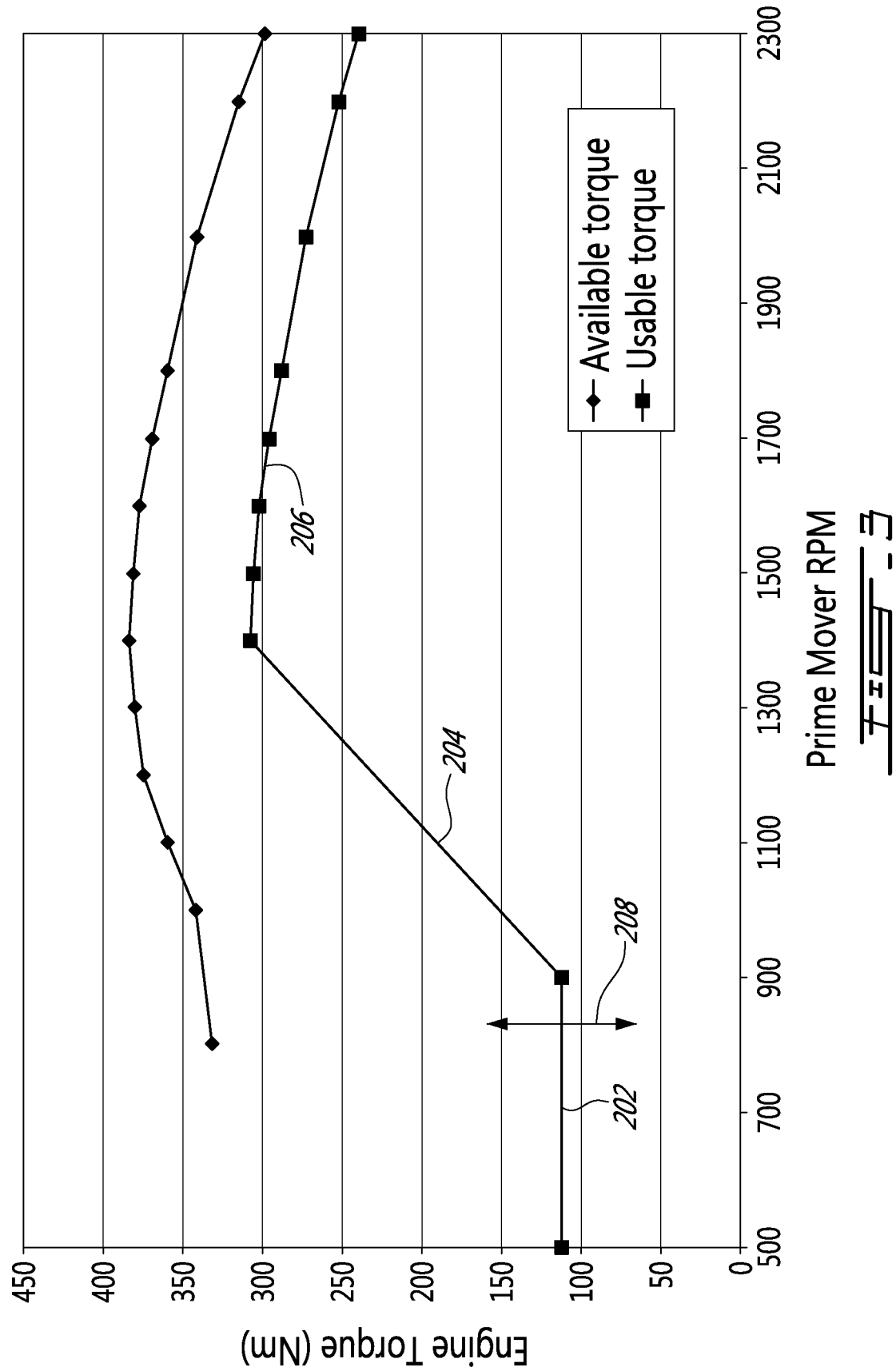
FIG. 3 is a graph illustrating the torque vs. RPM of a prime mover and the torque allowed to pass through a clutch vs. RPM.

FIG. 3 of the appended drawings illustrates the available torque vs. RPM for a particular ICE. One skilled in the art will understand that different ICEs have different available torque with respect to the RPM.

From the instantaneous available torque, the controller 42 determines a usable torque in step 104. The usable torque is generally lower than the available torque and provides a safety margin to prevent the ICE 12 from stalling. The usable torque may vary depending on the clutch temperature data supplied by the temperature sensor 16' to the controller 42. Indeed, the increase in clutch temperature is mainly caused by a partial slipping of the clutch, for example when a torque larger than the usable torque attempts to pass though the clutch 16. Accordingly, should the temperature of the clutch reach a predetermined threshold, the controller 42 may be so configured as to either increase the pressure in the clutch to prevent slipping; decrease the pressure in the clutch to reduce friction and therefore reduce the temperature increase; completely disengage the clutch; modify the gear ratio of the CVT; change the rotational speed of the ICE 12; or change the cooling fluid flow rate in the clutch.

As a non-limiting example, the controller 42 could be so configured that when the clutch reaches a first temperature threshold, the pressure in the clutch is decreased to thereby reduce friction and therefore temperature increase and, should a second higher threshold be reached, the clutch is completely disengaged. Of course, one skilled in the art can configure the controller 42 according to the specific requirements of a particular drivetrain.

Again, FIG. 3 illustrates a non-limiting example of a usable torque vs. RPM. It is to be noted that the usable torque does not follow the available torque at low RPMs. The reason therefor will be explained hereinbelow.

It is to be noted that the usable torque illustrated in FIG. 3 is the usable torque at the output of the ICE 12. The use of a CVT 14 downstream from the ICE allows this usable torque to be modified by the CVT 14. Indeed, the torque is multiplied as a function of the ratio of the CVT. The controller therefore uses its knowledge of the instantaneous ratio of the CVT 14 to determine a usable torque at the input of the clutch 16 and this value is used in the next steps. In other words, the usable torque graph of FIG. 3 is modulated as a function of the CVT ratio by the controller 42.

Furthermore, the double arrow 208 of FIG. 3 illustrates that the controller may modulate the usable torque allowed to pass through the clutch 16 depending on the clutch temperature data. One skilled in the art will understand that the user throttle control and the CVT ratio also modulates the usable torque.

It is to be noted that the usable torque values can be stored in a look-up table provided in the main controller 42, for example. Accordingly, the controller 42 may quickly determine the usable torque from the speed of the output of the ICE 12.

Returning to FIG. 2, the controller 42, in step 106, supplies the instantaneous usable torque to the clutch controller 44 that controls the clutch 16 so that slippage of the clutch 16 occurs if a torque greater than the usable torque attempts to pass therethrough. Accordingly, should a block load be applied, for example by preventing wheels of the off-highway vehicle from turning, the torque requested by the wheels and therefore attempting to pass through the clutch 16 increases drastically and quickly exceeds the usable torque. When this occurs, the clutch 16 slips, preventing the ICE from stalling and protecting the various components of the drivetrain, including the CVT 14. Indeed, as is well known to those skilled in the art, should the output shaft of the ICE be prevented from rotating while the ICE is operating, the ICE would stall. Slippage of the clutch 16 above a usable torque level therefore ensures that the output shaft of the ICE is not prevented from rotating.

The method 100 could stop there. It would therefore loop back to step 102 and repeat the above-described steps.

However, since the drivetrain 10 includes a CVT that can inherently modify the speed ratio and therefore the available torque at the input of the clutch 16, supplemental steps may be added to the method 100 to improve the usability of the drivetrain 10.

Step 108 involves the determination of the slippage level of the clutch 16. This is done by the slip quantifier 46 and the slippage level data is supplied to the main controller 42.

The controller 42, in step 110, branches to step 112 if the clutch slippage is non-null. In other words, if there is slippage, step 112 is performed.

In step 112, the controller 42 takes over the ratio controller 38 and dictates the ratio of the CVT 14. The controller 42 is so configured that the ratio of the CVT is decreased in proportion of the slippage of the clutch 16. Indeed, since the usable torque increases as the CVT ratio decreases, the slippage setpoint of the clutch 16 is automatically modified by the controller 42 and slippage may stabilize, decrease and/or stop.

One possible way of controlling the drivetrain 10 is to control the clutch slippage so as to stabilize it. This is done by gradually changing the CVT ratio until the clutch slippage remains substantially constant.

Step 112 loops back to step 102.

Should no slippage be detected in step 110, the step 114 is performed. In this step, if the CVT ratio was controlled by the controller 42 as discussed hereinabove with respect to step 112, the control of the CVT ratio is gradually returned back to the user since the usable torque is sufficient to drive the load 20. This is done gradually so as to prevent sudden change in driving behavior, which is detrimental to the user driving sensations.

The performance of the drivetrain may be controlled by the user in those circumstances. This step returns to step 102 to loop the method 100.

Returning to FIG. 3, the non-limiting example of the usable torque graph may be separated in three zones. A low RPM zone 202, a medium RPM zone 204 and a high RPM zone 206.

In the low RPM zone 202, the usable torque is set significantly lower than the available torque. Accordingly, the slippage of the clutch 16 will be more pronounced at these speeds.

In the medium RPM zone 204, the usable torque linearly increases with the RPM but is still significantly lower than the available torque from the prime mover mainly to prevent the ICE from stalling. Accordingly, should a small block load prevent rotation of the wheels, an increase in RPM (while in the zone 204) may cause the wheels to rotate. This has been found to give better driving sensations to the operator. Of course, the linearity of the medium RPM zone is not required, and other functions could be used.

Finally, in the high RPM zone 206, the usable torque follows the available torque with a safety margin.

As an example of application of the drivetrain 10, the operation of a loader tractor will be briefly described. Such a tractor often has to push against obstacles, for example when its bucket is being filled. When this is the case, the ICE must be prevented from stalling. By providing a drivetrain as proposed herein, the ICE stalling would be prevented by the selective slipping of the clutch and the torque supplied to the wheels would be increased by the control of the CVT ratio. All that without special intervention of the operator other than actuating the throttle control according to the desired speed of the vehicle.

Of course, a clutch pedal or other user control could be used to disengage the clutch 16 manually by the operator.

As will be easily understood by one skilled in the art, the main controller 42 could integrate the ratio controller 38, the clutch controller 44 and/or the slip quantifier 46.

One skilled in the art will understand that while a temperature sensor 16' has been integrated with the clutch 16 to supply temperature data to the main controller 42, other techniques could be used to obtain or approximate the temperature of the clutch 16. As a non-limiting example, the temperature of the oil used in the clutch could be measured. Alternatively, since we know that the clutch temperature increases when the clutch 16 slips and that we know when the clutch is slipping and the level of this slipping, thanks to the clutch slip quantifier 46 supplying data to the controller 42, thanks to the slip quantifier 46, the controller 42 may approximate the clutch temperature using the clutch slipping data.

Of course, one skilled in the art understands that limiting the temperature in the clutch 16 increases the useful life of the clutch and provides a more robust drivetrain.

It is to be understood that the clutch temperature management in a slip control method and arrangement for a drivetrain including a continuously variable transmission is not limited in its application to the details of construction and parts illustrated in the accompanying drawings and described hereinabove. The clutch temperature management in a slip control method and arrangement for a drivetrain including a continuously variable transmission is capable of other embodiments and of being practiced in various ways. It is also to be understood that the phraseology or terminology used herein is for the purpose of description and not limitation. Hence, although the clutch temperature management in a slip control method and arrangement for a drivetrain including a continuously variable transmission has been described hereinabove by way of illustrative embodiments thereof, it can be modified, without departing from the spirit, scope and nature thereof.

What is claimed is:

1. A method to control a slippage of a drivetrain including a prime mover having an output shaft, a transmission having an input connected to the output shaft of the prime mover and an output, a clutch having an input connected to the output of the transmission and an output; the clutch having a controllable slippage level between its input and output, means to obtain clutch temperature data, the slippage control method including:
   determining a usable torque of the prime mover using the clutch temperature data; and
   controlling the clutch so as to allow the usable torque to pass therethrough and to cause the clutch to slip should a torque between the input and output of the clutch be greater than the usable torque.

2. The slippage control method of claim 1, wherein the transmission is a continuously variable transmission.

3. The slippage control method of claim 1, wherein the clutch temperature data is obtained via a temperature sensor.

4. The slippage control method of claim 1, where the drivetrain further includes means to determine clutch slipping data, wherein the clutch temperature data is approximated using the clutch slipping data.

5. The slippage control method of claim 1, wherein the usable torque determining includes determining an available torque of the prime mover according to an instantaneous speed of the output shaft of the prime mover and calculating the usable torque at the instantaneous speed of the prime mover.

6. The slippage control method of claim 1, further including integrating the drivetrain to an off-highway vehicle.

7. A drivetrain including:
   a prime mover having an output shaft;
   a transmission having an input associated with the output shaft of the prime mover and an output;
   a clutch having an input associated with the output of the transmission and an output;
   means to determine a temperature of the clutch;
   a clutch slip controller controlling a level of torque allowed to pass through the clutch before slippage occurs therein; and
   a main controller associated with a prime mover speed sensor, the clutch temperature determining means and the clutch slip controller; the main controller being so configured as to determine a usable torque of the prime mover using clutch temperature data and to set the clutch slip controller so that the clutch slips when a torque higher than the usable torque attempts to pass through the clutch.

8. The drivetrain of claim 7, wherein the transmission is a continuously variable transmission.

9. The drivetrain of claim 8, further comprising means to detect slippage in the clutch and a ratio controller setting an output/input ratio of the continuously variable transmission; wherein the ratio controller decreases the ratio of the continuously variable transmission when slippage is detected.

10. The drivetrain of claim 7, wherein the clutch temperature determining means include a temperature sensor mounted in the vicinity of the clutch and associated with the main controller to supply clutch temperature data thereto.

11. The drivetrain of claim 7, further comprising means to detect clutch slippage associated with the main controller to supply clutch slipping data thereto, wherein the clutch temperature is determined by the main controller using the clutch slipping data.

12. The drivetrain of claim 7, wherein the clutch temperature determining means include a temperature sensor measuring a temperature of oil used in the clutch.

13. The drivetrain of claim 7, where the drivetrain is integrated in an off-highway vehicle.

* * * * *